United States Patent
Cockrell et al.

[15] 3,650,159
[45] Mar. 21, 1972

[54] COMPOUND HYDROSTATIC TRANSMISSION

[72] Inventors: Sanford C. Cockrell, Wyoming, Ohio; Robert J. Dorgan, Elnora, N.Y.

[73] Assignee: General Electric Company

[22] Filed: Sept. 25, 1970

[21] Appl. No.: 75,554

[52] U.S. Cl. ..............................74/720.5, 74/752 C, 74/865
[51] Int. Cl. ...................F16h 37/06, F16h 5/42, B60k 21/00
[58] Field of Search ......................74/720.5, 687; 180/6.48

[56] References Cited

UNITED STATES PATENTS

| | | |
|---|---|---|
| 2,580,946 | 1/1952 | Orshansky, Jr. et al. ................74/687 |
| 3,368,425 | 2/1968 | Lewis...................................74/720.5 |
| 3,492,891 | 2/1970 | Livezey................................74/720.5 |
| 3,545,303 | 12/1970 | Whelahan............................74/720.5 |
| 3,575,066 | 4/1971 | Livezey et al........................74/720.5 |

*Primary Examiner*—Arthur T. McKeon
*Attorney*—Frank L. Neuhauser, Oscar B. Waddell, Joseph B. Forman, Carl W. Baker and Francis K. Richwine

[57] ABSTRACT

A compound hydrostatic transmission wherein a speed increaser transmission is added to a steering transmission, the steering transmission including end planetaries whose sun gears are driven by one source from the speed increaser transmission and whose ring gears are capable of being braked or being driven by another source from the speed increaser transmission in producing low speeds with heavy torque and high speeds with lower torques, respectively, the steering transmission, in between the end planetaries, having infinitely variable hydrostatic means and being capable of driving the end planetaries at the same speeds or at different speeds in a steering operation departing from the straight-away.

15 Claims, 3 Drawing Figures

INVENTORS
SANFORD C. COCKRELL
ROBERT J. DORGAN

BY *J.F. McDevitt*

THEIR ATTORNEY

INVENTORS
SANFORD C. COCKRELL
ROBERT J. DORGAN
BY J.F. McDevitt
THEIR ATTORNEY

COMPOUND HYDROSTATIC TRANSMISSION

BACKGROUND OF THE INVENTION

A tractor type vehicle has continuous treads or tracks on each side of the vehicle which are driven at uniform speeds that drives the vehicle in a straight path, but are driven at different speeds when it is desired to turn the vehicle, the vehicle turning around the low speed side. When an extremely high degree of movability for the vehicle is desired, the transmission must produce infinitely variable speeds along the straightaway and, in the turning operation, the speeds must be infinitely variable and differentially applied. In such vehicles, this capability must be accompanied by the proper torque and speed requirement commensurate with the load and the transmission producing the variable speed should be carried out with a continuous drive applied to the load. This requirement is not accomplished by the use of gear shifting-type transmission and the use of clutches in the transmission because such type of transmission interrupts the drive power to the load during the shifting operation. In extremely heavy vehicles, such interruption creates a rough operation of the vehicle and can cause extreme wear and tear on the transmission and other parts of the vehicle.

Other types of transmissions attempt to avoid the disadvantages of gear shifting by the use of hydrostatic controlled planetary gearing. These type of transmissions do not develop the proper torque multiplication and extreme speed range for satisfactorily controlling such vehicles.

SUMMARY OF THE INVENTION

It is the object of this invention therefore to provide a transmission that will create greater torque multiplication and provide a greater range of variable speed without creating pause in its application to the load. This is accomplished by adding a speed increaser transmission to a steering transmission and controlling the increaser transmission to provide dual drives to the steering transmission.

The speed increaser transmission has an input that is directed to a shaft that drives the cylinder block of its pump and also the sun gear of a planetary gearing wherein the hydraulic fluid of the pump is transmitted to a fluid motor that drives the ring gear of the planetary gearing, the pump having capabilities of varying the amount of fluid from the pump and in this way varying the speed of the motor and the connected ring gear of the planetary gearing to control the variations of speed to the planet gear support of each planetary gearing. The steering transmission is also provided with a gear fixed to the input drive shaft, a gear connected to the support of the planet gears and a brake applied to the gear and planet support combination.

A steering transmission has a center shaft driven by the gear affixed to the power input shaft of the steering transmission, which center shaft drives a left and a right hydraulic pump unit and a right and a left sun gear of a right and left planetary gearing. The right and left motor unit drives the ring gears of the right and left planetary gearing in the same manner previously described. Second right and left planetary gearing having their sun gears driven by the planet gears of the right and left planetary gearing first mentioned, and a planet gear support of the second mentioned planetary are connected to the right and left output shaft, respectively. The gear affixed to the planet gear support of the speed increaser transmission drives a gear affixed to a shaft that extends across the steering transmission to drive the ring gears of the second planetary gearing for a high speed drive or to hold the ring gears stationary when it is desired to provide a low speed drive. The three sets of pump-motor units can drive their associated ring gears in either forward or reverse direction with a considerable variance in speed or torque and this coupled with the direct and planetary drive to the steering transmission creates an even greater variance in the speed and torque of the transmission as a whole, inasmuch as the planetary drive from the speed increaser transmission to the steering transmission drives the ring gears of the secondary planetary unit in the either forward or reverse direction at variance of speed as well as being capable of braking both of the ring gears of said secondary planetary units.

It is therefore the object of this invention to greatly improve the speed and torque range of a steering transmission that is particularly adaptable for heavy vehicles.

Another object of this invention is to provide an integrated steering and driving power system in which steering is accomplished by changing the relative speeds of traction devices on opposite sides of the vehicle.

BRIEF DESCRIPTION OF THE DRAWING

Further objects, features and advantages of the present invention will become more clear from the following detailed description of the preferred embodiment shown in the accompanying drawings which are illustrative only and are not intended to be limiting on the claims presented. The detailed description is taken in connection with the several views of the drawings in which:

DESCRIPTION OF THE PREFERRED EMBODIMENT

Figure 1:
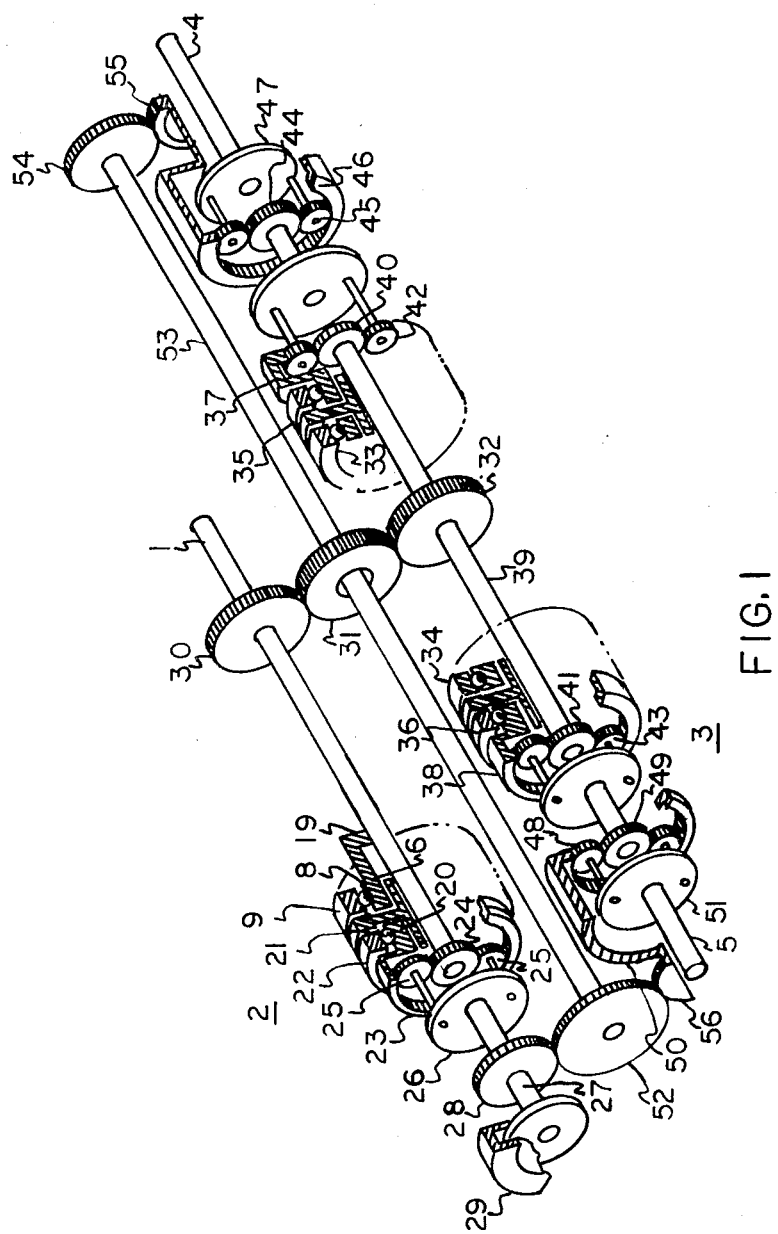
FIG. 1 is a cross-sectional view of the transmission arrangement of the power system of this invention.

The transmission of the present invention has power applied to shaft 1 of the speed increaser transmission 2, which speed increaser transmission drives the steering transmission 3 to develop the proper speed and torque for the right output shaft 4 and the left output shaft 5 for properly manipulating the right and left track or tread of the vehicle. Since both of these transmissions include reversible motor and pump units, it is considered expedient to first describe these units.

Figure 2:
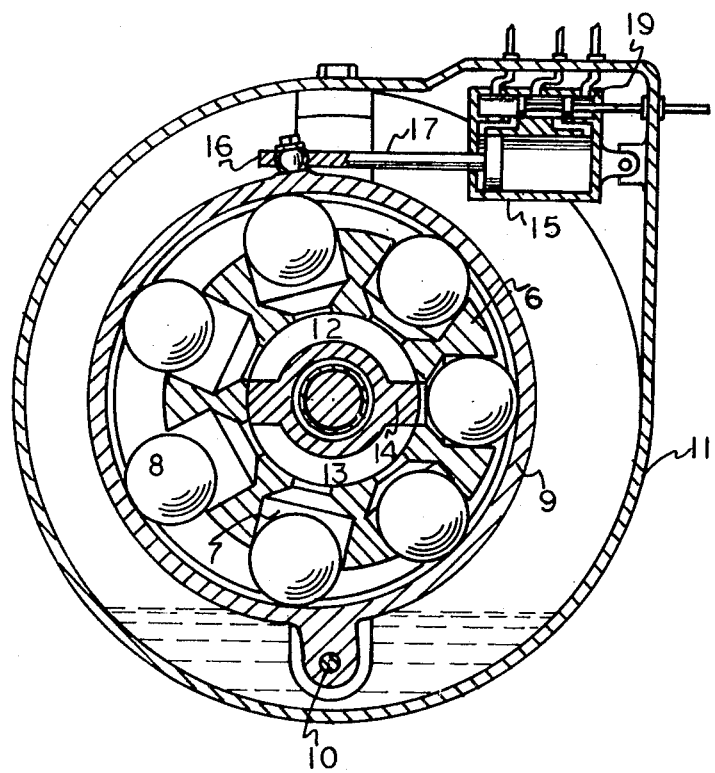
FIG. 2 is a cross-sectional view of a variable pump unit used in the power transmission.

As shown in FIG. 2, the pump unit includes a rotatable cylinder block 6 having a plurality of piston bores 7 axially positioned and opening outwardly from the periphery thereof and housing ball pistons 8. When the cylinder block is rotated, the ball pistons 8 are driven outwardly by centrifugal force and up against the ball pump race 9, the ball pump race being pivoted to the housing 11 by the pivot 10. It will be seen that as the cylinder block rotates and the balls are driven against the ball pump race, which draws fluid into channel 13, said balls will be forced inwardly at the right position of rotation by the eccentricity of the race 9 and thereby compress fluid in the cylinders which is forced into channel 12 formed in the pintle 14 about which the cylinder blocks 6 rotate. A motor unit is constructed similar to the pump unit and channels 12 and 13 extend over to similar channels in the motor unit. Due to the similarity of the units they can be either operated as a pump unit or as a motor unit. It will be seen that by varying the eccentricities of the ball pump race 9 the distance which the balls move withing their cylinders will vary and thus create varying flow by the pump unit to the motor unit and in this way the pump unit will vary the speed of the motor unit. To vary the eccentricity of the ball pump race 9, suitable means have been provided such as the fluid motor 15 connected to rod 17 journaled at 16 to the ball pump race 9 and suitably controlled by valve means 19. The infinitely variable action of the pump-motor unit is governed by the eccentricity of the ball pump race 9 and also by its capability of movement in a clockwise direction or in a counterclockwise direction in view of the two independent channels 12 and 13. For further understanding operation of the reversible ball pump and motor units, attention is called to the U.S. Pat. to Lewis, No. 3,368,425, dated Feb. 13, 1968.

Returning to the speed increaser transmission 2, power input is directed to shaft 1 which drives the integrally connected support 19 for the pump cylinder block 6 that drives the ball pistons 8 under the control of the ball pump race 9, as previously described. Fluid from the pump unit is transmitted to the motor block 20 and actuates the balls 21 as governed by the ball pump race 22 and thereby rotates the ring gear 23 which is connected to the motor block 20. Power shaft 1 extends over and drives the sun gear 24 which, in connection with the ring gear 23, controls the movement of the planet gears 25 and thereby the planet gear support 26 and shaft 27. Thus far, it is seen that the speed of the planet gears 25 is governed by the speed of rotation of the shaft 1 and the speed of rotation either in the forward or backward direction of the ring gear 23. Shaft 27 has a gear drive 28 to the steering transmission and also a brake 29, whereas power shaft 1 also has a gear drive 30 to the steering transmission.

Gear 30 drives gear 31 which drives gear 32 and thereby the right pump unit 33 and left pump unit 34 which units transmit, respectively, fluid that drives the right motor unit 35 and left motor unit 36 to drive the ring gears respectively of the right planetary gearing 37 and the left planetary gearing 38. The gear 32 also drives shaft 39 which extends to the right and drives the sun gear 40 of the first right planetary gearing 37 and extends to the left to drive the sun gear 41 of the first left planetary gearing 38. It will be seen that the speed of the planet gears 42 of the right first planetary gearing 37 is governed by the speed of the ring gear driven by motor 35 and the speed of the sun gear driven directly by the power input shaft 1, whereas the speed of the planet gears 43 is governed by the speed of the ring gear 38 as governed by the motor 36 and by the speed of the sun gear as driven by the power input shaft 1. The planet gears 42 drive the planet gear support which is integral with the sun gear 44 of the right second planetary gearing to drive the planet gears 45 around the ring gear 46; whereas the planet gear support 47 for the planet gears 45 drive the output shaft 4. The speed of the planet gears 45 is controlled by the sun gear 44 and the ring gear 46. Similarly, the planet gear support for the planet gears 43 drives the sun gear 49 of the left second planetary gearing which drives the planet gears 48 around the ring gear 50 to control the speed of the planet gear support 51 which drives the left output shaft 5. Gear 28, which is either braked by the brake 29 or driven forwardly or reversely by the pump-motor unit of the speed increaser transmission, drives gear 52 which is mounted on a shaft 53 that extends over to drive the gear 54, gear 54 driving gear 55 that drives the ring gear 46 of the right secondary planetary gearing, whereas gear 52 drives the gear 56 that drives the ring gear 50 of the left secondary planetary gearing.

When gear 28 is braked, gear 52, shaft 53 and gear 54 are braked thereby holding the ring gears of the secondary right and left planetary gearing stationary, and, under this condition, the right secondary planet gears 45 and left planet gears 48 rotate around their respective ring gears to create a slow speed and high torque multiplication to the output shafts 4 and 5. On the other hand, gear 28 may be rotated either forwardly or reversely at infinitely variable speeds and correspondingly rotate the ring gears of the secondary planetary gearing which, in connection with the motor and pump units and the intervening first planetary gearing of the steering transmission can vary the speed of the output shafts 4 and 5 over a wide range as desired. It will be seen that the power input shaft 1 constantly drives the pump unit of the speed increaser transmission which, due to the eccentric control of the ball pump race thereof, can vary the drive to the motor unit and therefore the drive to the first planetary gearing and from there to the second planetary gearing; whereas, gear 28 can drive or hold stationary the ring gears of the second planetary gearing. Thus, by manipulating the eccentrics of the pump-motor units and controlling the gear 28, the output shafts may be held stationary, driven at slow speeds with high torque or driven at high speeds with lower torque at an infinite variation of speed. With this compound transmission there is no gear shifting or clutch operation and therefore no shock in the power input means, in the transmission or in the vehicle itself. It will be seen that variable drive units other than the motor and pump units can be used in the transmission with almost equal results and further that the transmission can be utilized for creating a power output for use other than in driving the steering mechanism of a vehicle.

Further, it is apparent that other planetary gearing such as a third and a fourth planetary gearing, and so forth, can be utilized as desired; whereas units similar to the planetary gearing can be substituted.

In this compound transmission and aside from the input power, there are at least four adjustments, the three adjustments of the three pump eccentrics and the braking or the drive to the ring gears of the right and left end planetaries. Three more adjustments could be added, if desired, by providing selective adjustment of the three motor eccentrics rather than using stationary adjustments. It is obvious that there are different kinds and types of drive controls for operation of this transmission and a suitable hydraulic-servo controller which continuously matches engine speed to a reference position in the controller established by the operator's throttle position is described in the aforementioned U.S. Pat. No. 3,368,425. It is further apparent that the adjustment and control of the compound transmission can be carried out in different ways. As an illustration, one manner of operating the compound transmission will now be explained.

START POSITION

With the input power constantly applied the vehicle will be brought to and held in stop position by properly modifying the eccentrics of the pump-motor units so that the effective speed of ring gear 23 is equal to offset the effective speed of sun gear 24 with brake 29 being applied to absorb the torque load which stops shaft 27, gear 28, gear 52, shaft 53 and gear 54, gears 52 and 54 and also holds the end planetary ring gears 55 and 56 stationary so that the output shafts 4 and 5 are now being driven entirely by the sun gears of the end planetary gearing. Inasmuch as the input power is being constantly applied, the sun gears of the first planetary set are being constantly driven and therefore it is necessary to cancel the rotation of the planet supports in order to stop the sun gears of second planetary gearing, and this is accomplished by modifying the eccentrics on the pump units 33 and 34 to drive the motor units and attached ring gears of the first planetary set so that the effective speed of the ring gears on the planet gears of the first planetary set is equal to offset the effective speed of the sun gears of the first planetary set, wherefore the planet gears rotate on their own axis which axes will be held stationary and, being held stationary, will hold the sun gears of the second planetary set stationary so that the output shafts 4 and 5 will be held in stop position.

START AND DRIVE

With the vehicle held in stationary position as set forth above, the eccentric of the pump units 34 and 33 are now changed to increase or decrease the speed of the ring gears, depending on whether the vehicle is to be driven forwardly or in reverse. As the speed of the ring gears of the planetary 38 and 37 are increased in the forward direction, this will start the planet gears at the first planetary set to rotate about their sun gears and therefore to rotate the sun gears of the second planetary set which will drive the planet gears of the second planetary set around the stationary ring gears at low speed and high torque to start the output shafts into motion. At a suitable speed, brake 29 is released allowing pump 9 to drive motor 22 and thereby the planetary gearing of the speed increaser transmission to drive the ring gears of the second planetary set so that the planetary gearing of the second planetary set is now being driven by the ring gear drive as well as the sun gear drive and the speeds of these drives can be regulated in accordance with the setting of the eccentrics of the three pump units and also could if desired, be regulated by the setting of the eccentrics of the three motor units, and this, coupled with the increase input power, can drive the vehicle at an infinite variation of speed. The change from stop to variations in speed and to a further stop position is accomplished with constant input power and without any pause or jerk in the application of the input power to the load. In a turning operation, it is only necessary to vary the positions of the eccentrics of the two pump units of the steering transmission so that the output shafts will run at different speeds. Reverse speed is accomplished by increasing the ring gear speed in the opposite direction.

While a particular embodiment of a hydromechanical transmission has been shown and described, it will be obvious that changes and modifications can be made without departing from the spirit of the invention and the scope of the appended claims

POWER SYSTEM OPERATION

A suitable hydraulic servo controller of the same general type described in the aforementioned U.S. Pat. No. 3,368,425 can be adapted for automatic control of the present steering and driving power system whereby during low speed, high tractive effort operation, the steering transmission is isolated from the speed increaser transmission 3 by braking shaft 27 and at higher vehicle speed the shaft is released and the steering transmission permitted to operate so as to provide a large percentage of the overall speed range. Steering of the vehicle is accomplished by means of a conventional steering wheel which transmits a signal directly to the controller to bias the drive ratios in the right and left hand pump-motor units 33 and 34, respectively, and provide a differential speed to the treads or tracks on each side of the vehicle. The operator selects an operating mode for the power system using means to generate a signal in the controller indicating the desired direction of travel for the vehicle. With said drive signal selected, the operator generates a throttle signal in the controller representing the desired engine speed, such as by depressing an accelerator pedal, whereupon the controller continuously matches engine speed to a reference position established by the operator's throttle position. An error signal between engine and reference speed then automatically sets the drive ratio in the transmission to maintain a desired horsepower output at the vehicle treads or tracks. Horsepower output at any engine speed is predetermined from the horsepower, speed and fuel-consumption curves for the particular engine employed. When the right first planetary gearing 37 and the left first planetary gearing 38 reach the top limit of their speed range, the brake 29 is released thereby permitting the steering transmission to become operative and further increase the output speed of the compound hydrostatic transmission.

Figure 3:
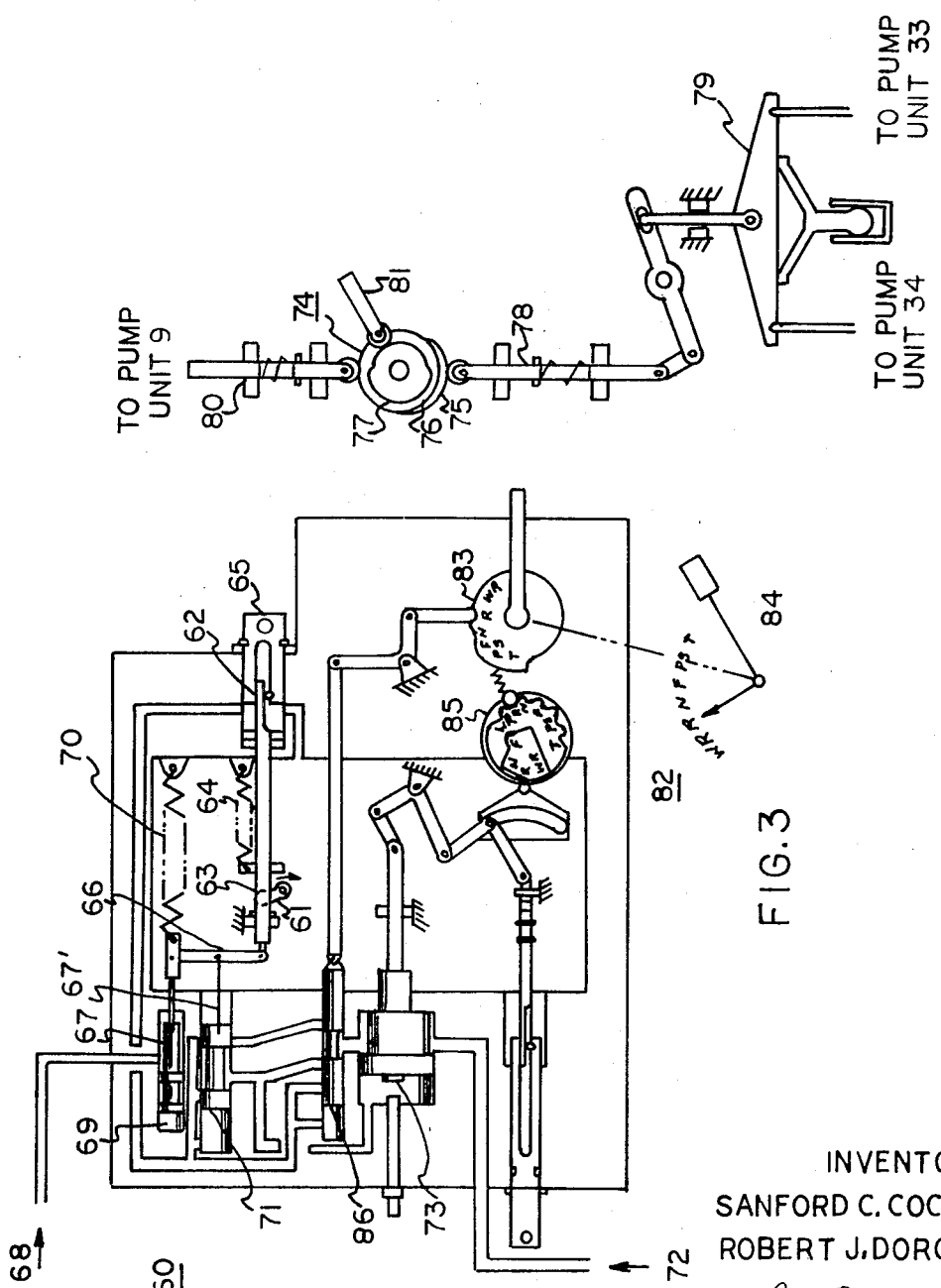
FIG. 3 is a schematic drawing for a hydraulic-servo controller adapted to provide the control functions in an integrated steering and driving power system according to this invention.

FIG. 3 is a schematic drawing for a hydraulic-servo controller adapted to provide the above described control functions which includes means to generate a throttle signal indicating the desired throttle setting of the prime mover or engine in the power system, means to generate a signal indicating a desired direction of travel of the vehicle, means responsive to said throttle signal and to said direction signal to generate first and second drive ratio signals in said power system, and means responsive to said first and second drive ratio signals to adjust separately the displacements of first and second pump-motor units in said power system so as to vary the power and torque supplied to the traction devices on opposite sides of the vehicle. With reference to FIG. 3, a speed reference or throttle input signal is furnished to a controller 60 through mechanical linkage from an accelerator pedal. Depression of said accelerator pedal (not shown) causes clockwise rotation of an accelerator input arm 61 in the controller which is connected to an input shaft 62. The input shaft pulls away from stop 63 and is moved by spring 64 against the restriction of a dashpot 65 located in series with said spring. The purpose of said dashpot is to reduce the system transients which could result if the vehicle operator "tramped" the accelerator pedal down or suddenly released it. Countermovement of the input shaft 62 back to the idle position is accomplished by an external accelerator pedal spring (not shown). Motion of the input shaft is transmitted on one end of sunning bar member 66 opposite to that which receives a speed sensing signal as hereinafter described. A speed sensing signal is generated in the controller by operation of spool valve member 67. A fluid pressure connection 68 to the controller allows hydraulic fluid from an external positive displacement pump (not shown) having an output flow proportional to prime mover engine speed to enter cylinder 69. Increased flow of the hydraulic fluid increases the pressure upon spool valve 67 causing it to move against the force of a reference spring 70 and apply output motion to the end of summing bar 66 opposite the end receiving the throttle input signal. Pilot piston 71 receives two signals through the summing bar, one proportional to intended engine speed (throttle input signal from the accelerator pedal position) and one proportional to actual engine speed. The difference between these two signals or the speed-error signal, operates through a connecting lever 67 to position the pilot piston. Pressurized oil from the transmission enters controller 60 through connection 72 and is ported through the small end of a power piston 73 to the pilot piston 71 by the path shown in the schematic drawing. Power piston 73 is a differential area piston with the small end always subjected to the transmission oil pressure. As also apparent from the porting path shown in said schematic drawing, the pilot piston either ports oil to or vents oil from the large end of said power piston. Porting oil to the large end of the power piston moves the piston to the right whereas venting the large end of said piston moves the piston to the left. In the absence of a speed-error signal, the pilot piston blocks oil flow to both said ends of the power piston and there will be no change of drive ratio in the compound hydrostatic transmission. When the accelerator pedal is depressed, however, to call for increased engine speed the summing bar moves the pilot piston to the right and ports oil to the large end of the power piston, moving it to the right and momentarily increasing transmission ratio. With increased transmission and increased throttle opening, the engine speed increases which causes spool valve 67 to move to the left and move pilot piston 71 in the same direction. As the pilot piston moves to the left it first blocks flow of oil to the left side of the power piston thus halting any increase of transmission ratio. As the pilot piston moves further to the left, the large end of the power piston is vented allowing it to move to the left and decrease transmission ratio. Assuming that vehicle power requirements have not changed, the transmission will stabilize with an increased engine and vehicle speed and a decreased transmission ratio.

The controller power piston imparts a linear motion dependent upon engine speed and accelerator pedal position to a control plate member 74. The function of said control plate is to provide a simple linear relationship between controller output and the plurality of actuating valve means 19 which establish the drive ratio in each of the three variable hydrostatic units in the compound transmission. Said control plate can be disposed intermediate the controller and said hydrostatic units to synchronize movement of the actuating valve means 19 for each unit by means of cam elements 75–77 which cooperate with individual control rods leading to each unit. Specifically, the cam element 75 regulates movement of an output control rod 78 which is connected to steering arm member 79 by spring-loaded linkage for actuating valve means 19 in pump units 33 and 34 of steering transmission 3. In corresponding fashion, cam 76 cooperates with output control rod 80 to actuate valve means 19 in pump unit 9 of speed increaser transmission 2. Cam 77 regulates movement of output control rod 81 to operate hydraulic valve means (not shown) which actuate brake member 29 in the speed increaser transmission. Since all combinations of speed and direction are included in the cam rotation of said control plate, a drive selection means 82 is provided to the controller which enables the operator to select forward, neutral or reverse ranges. For illustrative purposes in this embodiment, six input selections have been designated which are high speed reverse (WR), reverse (R), neutral (N), forward (F), push-start (PS) and tow (T). The linear output of power piston 73 is converted into a direction and magnitude depending upon the position of a range control link 83 in the controller. In either forward or reverse ranges, the compound hydrostatic transmission will always be in neutral as long as the power piston is completely to the right. If range selector 84 which is manually controlled by the operator is in forward, stroking of the power piston will cause the cam surface 85 to move resulting in the controller output moving from N to F. Similarly, if reverse or high-speed reverse is selected, the controller output will move between N and R or WR. In neutral and push-start, the cam lobe 85 on range link 83 operates a bypass piston 86 located between power piston 73 and pilot piston 71. In neutral, the power piston is hydraulically held to the right and is unaffected by accelerator pedal position or engine speed. Similarly, in push-start, the power piston is held to the left and the transmission ratio is reduced to its minimum value for starting. In straight forward or reverse operation, steering arm 79 moves back and forth to actuate pump units 33 and 34 equally as signaled by the controller and the control plate output. When the operator turns the steering wheel, however, a steer signal is given to the control plate. This causes the steering arm to pivot and impart more stroke to one of the actuating valve means 19 than to the other which varies drive ratios at opposite sides of the vehicle. At low vehicle speeds it becomes possible to insert a steering signal large enough to cause one traction device to reverse direction relative to the other traction device. In so doing, the vehicle can execute a pivot turn about the vertical vehicle axis.

While a particular embodiment of a hydromechanical transmission has been shown and described along with its mode of operation in a power train system, it will be obvious that changes and modifications can be made in said system without departing from the spirit of the invention and the scope of the appended claims.

What is claimed as new and desired to be secured by Letters Patent of the United States is:

1. A compound transmission including a first transmission having a controllable input power and a controllable infinitely variable and reversable output power and
   a second transmission having controllable right and left infinitely variable and reversable power means and right and left gears driven by said output power, right and left planetary gearing, means driving the sun gears by said right and left gears controllably modified by said right and left power means, means driving the ring gears by said infinitely variable and reversable output power and right and left planet gears connected to drive right and left output shafts, respectively.

2. A transmission including a drive means, an infinitely variable and controllable transmission connected to said drive means, planetary gearing connected to said infinitely variable and controllable transmission, output means driven by said planetary gearing, and means selectively braking the ring gear of said planetary gearing or for driving said ring gear at controllable infinitely variable speeds.

3. A transmission as set forth in claim 2 wherein said infinitely variable and controllable transmission includes a fluid pump and motor units, said pump and motor being connected by closed fluid circuits, said pump and motor being reversible and at least said pump having means for varying the displacement of fluid to said motor.

4. A transmission as set forth in claim 3, wherein said planetary gearing includes: a first planetary gearing having a sun gear connected to said drive means and its ring gear connected to be driven by a motor unit, and a second planetary gearing having its sun gear driven by the planet gears of said first planetary gearing and the planet gears of said second planetary gearing driving said output means, and said means for braking or driving said ring gear driving the ring gear of said second planetary gearing.

5. A transmission as set forth in claim 4, wherein the means for driving said ring gear at controllable speeds, includes an infinitely variable and controllable pump and motor unit connected to said drive means.

6. A compound transmission including a first transmission having an input shaft and a controllable infinitely variable output shaft, and a second transmission having a dual drive from said first transmission with controllable infinitely variable transmission means between said dual drive, controlling an output means, one of said drives connected to said input shaft, and the other of said drives connected to said infinitely variable output shaft.

7. A compound transmission as set forth in claim 6, wherein the controllable and infinitely variable means of said first transmission and of said second transmission include; flow circuit connected fluid pump and motor units, at least said pump unit being controllable to vary its displacement of fluid to its motor unit.

8. A compound transmission as set forth in claim 7, wherein said infinitely variable transmission means of said second transmission further includes, a first planetary gearing having its sun gear driven by said one drive from said input shaft and its ring gear driven by a motor unit, and a second planetary transmission having its sun gear driven by the planet gears of said first planetary gearing and its ring gear driven by the other of said drives of said first transmission, and output means driven by the planet gears of said second planetary gearing.

9. A compound transmission including, a first transmission including a power input shaft and an output shaft driven from said input shaft through the medium of controllable speed and torque variance means, said output shaft being capable of being braked without stopping said input shaft, and
   a second transmission having an input shaft and an output shaft driven from said input shaft through the medium of controllable speed and torque variance means operated by the interconnection of variable movable parts,
   a means driving certain of said parts by said input shaft of the first transmission, and means driving the other of said parts by the output shaft of said first transmission.

10. A transmission including, a power input; a shaft driven by said power input, and having right and left sun gears; right and left means connected to said shaft and controllable as to speed and torque for infinitely variable output; right and left ring gears connected to be driven by said infinitely variable output; right and left planet gears cooperating with said right and left ring gears and said right and left sun gears to form a first set of planetary gearing; a second set of right and left planetary gearing having their sun gears, respectively, driven by the planet gears of said right and left planet gears of said first set of planetary gearing; right and left planet gear supports for the planet gears of said second set of planetary gearing; means for connecting said planet gearing support to right and left output shafts, and ring gears for said second set of planetary gearing.

11. A transmission as set forth in claim 10, including means driven by said power input controllable as to speed and torque, and means connecting said controllable means for driving said ring gears of said second planetary gearing.

12. A transmission as set forth in claim 11, including means for selectively braking said connecting means to hold the ring gears of said second planetary gearing stationary.

13. A compound transmission particularly useful for steering vehicles including, a speed increaser transmission, a steering transmission including end planetary gearing, the sun gears of said end planetary gearing being driven by one source form the speed increaser transmission, the ring gears of said end planetary gearing being selectively capable of being braked or being driven by another source from the speed increaser transmission, the planet gears of said end planetary gearing being connected to output shafts, and the steering transmission in between the end planetaries having infinitely variable and controllable means connected to modify the drive from one of said sources and being capable of driving the end planetaries at the same speed or at different speeds for a turning operation.

14. A vehicle transmission including, a first transmission having an input shaft, infinitely variable and controllable pump and motor units connected to be driven by said input shaft, said pump and motor units being interconnected by closed fluid circuits, a planetary gearing having its sun gear connected to be driven by said input shaft, its ring gear connected to be driven by said motor unit, and a control shaft connected to be driven by the planet gears of said planetary gearing and a second transmission having a drive shaft, right and left sun gears driven by said input shaft, right and left infinitely variable and controllable pump and motor units driven by said input shaft, each pump and motor unit being interconnected by a closed fluid circuit, a right and left ring gear respectively connected to the right and left motor unit, planet gears cooperating with said right and left sun gears and said right and left ring gears to form a first right and left planetary gearing, a second right and left planetary gearing having its sun gears respectively driven by the planet gears of said right and left first planetary gearing, right and left ring gears driven by said control shaft, and planet gears for said second planetary gearing and connected to right and left output shaft.

15. A vehicle transmission as set forth in claim 13, including a brake for selectively stopping said control shaft.

\* \* \* \* \*